Figure 1:
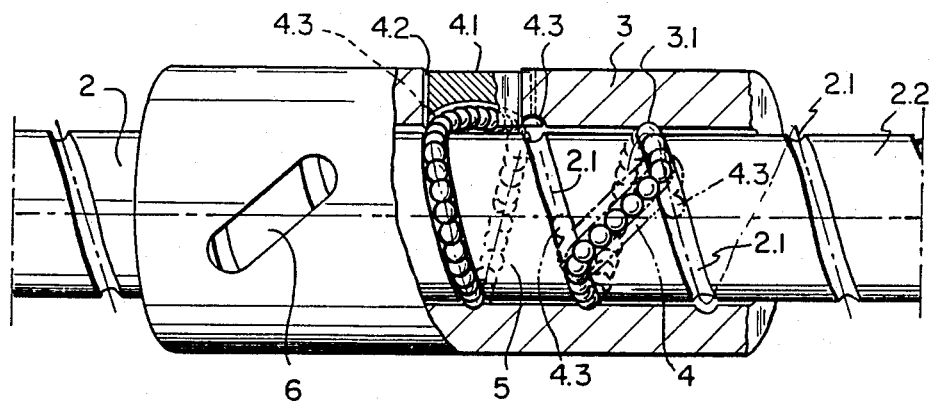

United States Patent [19]

Andonegui

[11] Patent Number: 4,905,534
[45] Date of Patent: Mar. 6, 1990

[54] LEAD SCREW WITH BALLS RECIRCULATING BY DEFLECTOR WITH HALF-SPHERICAL SUPPORTS

[75] Inventor: Pedro M. Andonegui, Vitoria, Spain
[73] Assignee: Waybol, S.A., Vitoria, Spain
[21] Appl. No.: 186,247
[22] Filed: Apr. 26, 1988

[30] Foreign Application Priority Data

Apr. 29, 1987 [ES] Spain ................... 8701272

[51] Int. Cl.$^4$ ............................................. F16H 25/22
[52] U.S. Cl. ................... 74/459; 74/424.8 R
[58] Field of Search ................ 74/424.8 R, 459

[56] References Cited

U.S. PATENT DOCUMENTS

| | | | |
|---|---|---|---|
| 2,519,777 | 8/1950 | Mill | 74/459 |
| 2,618,166 | 11/1952 | Douglas | 74/459 |
| 2,895,343 | 7/1959 | Orner | 74/459 |
| 2,945,392 | 7/1960 | Folkerts | 74/459 |
| 3,176,535 | 4/1965 | Rowland | 74/459 |
| 3,580,098 | 5/1971 | Goad | 74/459 |
| 3,815,435 | 6/1974 | Eschenbacher | 74/459 |

FOREIGN PATENT DOCUMENTS

| | | |
|---|---|---|
| 2249578 | 5/1975 | France . |
| 160274 | 6/1970 | Spain . |
| 262335 | 12/1981 | Spain . |
| 897008 | 5/1962 | United Kingdom . |

OTHER PUBLICATIONS

"Examination of Deflector of Various Patents", Waybol, S. A., Feb., 1988, pp. 1-11.

Primary Examiner—Allan D. Herrmann
Attorney, Agent, or Firm—Frishauf, Holtz, Goodman & Woodward

[57] ABSTRACT

A lead screw with balls recirculating by deflector which has half-spherical supports with an undulating spheroidal movement for the self-alignment of the channel mouths of the nut-deflector unit is described. This is a deflector wherein the body (4.1) of the deflector has two equal half-spheres (4.3) adhered or joined laterally to it, each of the said half-spheres being joined to each of the walls (4.4) opposite to each of the entry mouths (9) of the S-shaped groove (7) of the deflector. The radius of the half-spheres (4.3) is equal to the radius of the ball bearings (1) and smaller than the generator radius of the semicircular profile of the channel (3.1) of the thread of the internal periphery of the nut. The distance between the body of the deflector and the points of contact (10) of the half-spheres with the canal of the nut is greater than the free play between the periphery of the deflector body and the walls of the housing hole (6).

4 Claims, 2 Drawing Sheets

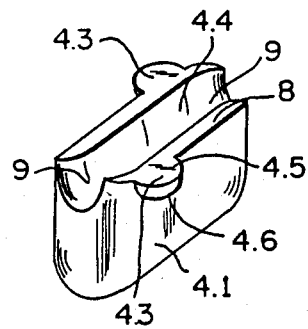
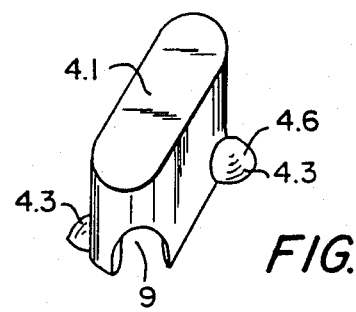
FIG. 5  FIG. 6
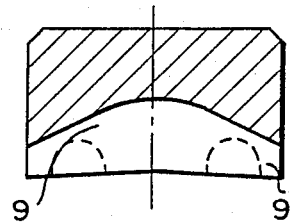
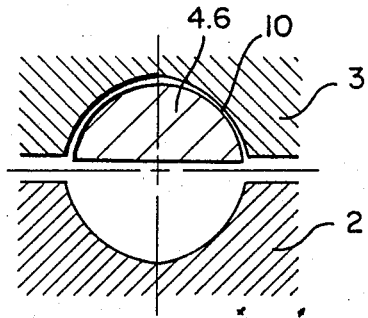
FIG. 7  FIG. 9
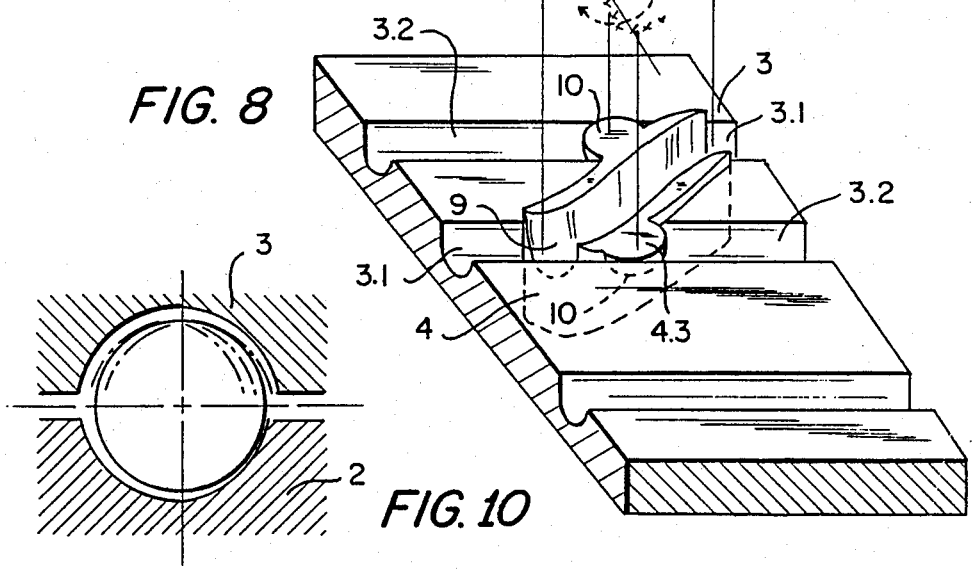
FIG. 8  FIG. 10

LEAD SCREW WITH BALLS RECIRCULATING BY DEFLECTOR WITH HALF-SPHERICAL SUPPORTS

The present invention refers to a lead screw with balls recirculating by deflector, wherein the deflector is mounted with free play in a hole made radially in the nut and attached by means of two half-spheres which rest in the channel of the thread of the internal periphery of the nut, the passage of the balls through the deflector creating an undulating spheroidal movement of the deflector in order to self-align constantly and exactly the continuity between the mouths of the thread channels of the nut and the mouths of the recirculation groove of the deflector, this self-alignment being maintained by the passage of the balls itself, by which means a gentle, continuous and regular rolling of the balls is achieved. This undulating spheroidal motion has the extremely important characteristic that as well as allowing difficulties arising from inaccuracies which exist initially in any manufactured item to be overcome, such as for example differences of pitch between the thread of the lead screw and the nut, differences in the geometry of the profile which is not usually constant along the length of the thread, differences existing in the diameters of the balls themselves, which implies that there may be variations in pressure on the balls during their circulation and, in addition, when the angle of contact varies as a result of different load magnitudes applied to the balls, etc., it also allows future geometric variations, which are the consequence of variations in operating conditions, to be adjusted to or overcome, these being due to variations of speed, variations of preloads, abrasion, heat conditions or any other variations in operating conditions, etc., thus allowing a very longlasting ball lead screw of a greatly improved quality to be achieved, and moreover achieved in an easy and economical way.

Described simply, a ball lead screw is a mechanism which comprises a lead screw which is a cylindrical axle on the external surface of which a helicoidal groove or canal of a constant pitch and half-spherical profile is threaded, which define a helicoidal crest between the lines of thread of the said groove; a hollow cylindrical nut which has threaded on its internal periphery a helicoidal groove canal of a constant pitch and half-spherical profile the same as and complementary to those of the lead screw enclosing the nut to the lead screw in a suitable number of lines of thread or circuits, forming a channel in the form of a helicoidal tube as the said helicoidal grooves or canals of the nut and the lead screw line up meeting each other concentrically, there being a slight radial play between the external surface of the helicoidal crest of the thread of the lead screw and the helicoidal crest of the thread of the nut. A multiplicity of balls are encased within the channel in the form of a helicoidal tube formed by the grooves of the thread of the nut and of the aforementioned lead screw, these balls having a suitable diameter which is less than that of the half-spherical profile of the helicoidal groove, and the arrangement being such that when rotation relative to the lead screw and to the nut is imparted, a relative axial movement between them is produced, by means of the contact and the pressure on the balls which roll along the said grooves. So that the balls roll continuously in the movement described, it is necessary to have a ball recirculating mechanism, which can convert their flow into a closed circuit of rolling balls.

In ball lead screws the lead screw generally has a greater number of lines of thread than the nut; because of this the ball recirculating mechanism is incorporated in the nut.

More unusually the nut has a greater number of lines of thread than the lead screw; in this case, the ball recirculating mechanism will be incorporated on the surface of the lead screw.

Our invention concerns the more general mechanism, incorporated in the nut.

Two forms of ball recirculating mechanism incorporated in the nut are already familiar, and these are know as: external recirculation by helicoidal tube or canal external to the surface of the nut, and internal recirculation by deflector on the internal surface of the hollow of the nut.

One of the differences between external and internal recirculation is that generally, due to the possibilities of its operation, external recirculation can form a closed circuit of balls linking the ends of a spiral of several lines of thread, and internal recirculation alone forms a closed circuit linking the ends of one of the lines of thread only, the nut having as many deflectors as the nut in question has lines of thread with balls.

The functional and constructional characteristics of these two forms of recirculating mechanism are different. In that of recirculation by external helicoidal tube or canal two holes in the form of a through tube are made in order to connect the ends of the threaded groove of the internal surface of the nut, the balls penetrating through one end of the groove towards the inside of the hole of the action of a spoon-shaped point of a tube embedded in the hole and continuing along this closed tube which extends along the external surface of the nut as far as the other hole in which the tube is embedded penetrating until its other end, which also has a spoon-shaped point, deposits the flow of balls into the complementary helicoidal grooves of the nut and of the lead screw, and the other way round, when the direction of the relative turn of the lead screw and the nut is changed.

The recirculating mechanism by internal deflector comprises a deflector which is a cap mounted on a through hole made in a radial direction in the nut with one internal face lined up in parallel with the internal surface of the nut, the said cap being generally manufactured out of a single piece. An S-shaped canal or groove is cut in the internal face of the cap, with a suitable section or profile so that the balls can pass through it. The through hole, made in a radial direction in the nut has to project itself sectionalizing and emptying two equal stretches of two lines of thread adjacent to the helicoidal canal or groove threaded on the inside of the nut and consequently they empty the portion of helicoidal crest between the two lines of thread concerned. The emptied shapes in each line are equal and symmetrical in relation to an imaginary straight line which forms an X-shaped figure in the direction of the spiral of the thread of the nut.

In the recirculating mechanism by internal deflector, each spiral, line or 360° turn of the helicoidal threaded groove of the nut forms a closed flow circuit of balls, and this is achieved by blocking the continuity of the canal of the groove of the thread of the nut through which the said balls were passing, by means of the cap described above, making the balls pass to the other end of the spiral of the thread via the S-shaped canal or groove cut in the cap, through which they penetrate the surface of the body of the nut, and lightly touching the external surface of the crest of the lead screw they describe a form of advance trajectory parallel to the profile of the crest of the lead screw contained halfway between the two ends of the threaded groove which connect with each other to form the closed circuit.

The slope of the S-shaped canal made in the internal face of the cap goes in the opposite direction to that of the spiral of the thread of the nut, the depth of the S-shaped groove being such that, when the balls roll over an intermediate crest of the thread of the lead screw, the balls rest against the cavity of the groove and the crest of the lead screw, with a small amount of free play in their movement. The entry mouths of the S-shaped groove present a cross-section such that they form a continuity of alignment with the helicoidal groove of the nut, the wall facing the mouth presenting the curved shape of a spoon suitable for gently deflecting the trajectory of the balls towards its internal canal, lightly touching or sliding with free play over the crest of the lead screw towards the other mouth, which is symmetrical with the aforementioned mouth but in the opposite direction, and the balls can be fitted between the grooves of the lead screw and the nut where they roll subjected to pressure.

Each mouth of the S-shaped groove is open at the ends of the canal in order to collect or deposit the recirculating balls depending on the direction of circulation of the balls. The walls facing the mouths collect the balls, not allowing the balls to continue rolling along the same canal of the nut in which the mouth is opened, portions of the helicoidal canal without balls remaining behind this wall of the deflector cap, so that between each two deflectors there is a portion of the helicoidal canal of the nut which remains empty, containing no balls.

Mechanisms of ball lead screws of the type described with recirculation by deflector are described in U.S. Pat. No. 2,618,166 of 18 Nov. 1952, in favour of J. G. Douglas and in Spanish Utility Model No. 160,274 of 4 Dec. 1970, in favour of ROTAX LIMITED and at present expired.

In synthesis, the construction of the deflector, in order to work perfectly, has to be done in such a way that the alignment between the continuation of the sections of the helicoidal groove of the nut meets an exact continuation from the entry mouth in the S-shaped groove to the other exit mouth, which must also be aligned exactly with the helicoidal groove in the other end; also the depth of the S-shaped groove has to be an exact parallel with the profile of the lead screw which is rolled by the balls as they pass changing canals, maintaining exactly an equal and minimum free play in the said course as they pass through the deflector.

Exact synthesis have the drawback that, in specific applications, there are always constructional errors or errors from wear, etc., due to looseness, tolerances, machining errors, assembly errors, dynamic, elastic and heat effects, which is why there is a need for methods of optimisation, which can be considered as approximate, with a few minimum deviations from desired conditions.

The various problems which the construction of an improved internal recirculation system by deflector has brought about have provided a broad knowledge of deflector varieties, such as they are:

In the construction of the through hole made in a radial direction in the nut in which the deflector cap is mounted, three principal shapes are known, these are the round form, two round forms with separate centres and the oval form. These holes shape as many more external forms of the deflector body.

When the deflector is mounted in the hole, it can be seen firstly that there has to be a difference between the shape of the perimeter of the hole wall and the side surface of the deflector body, by which positive or negative differences of free play are produced which have to be corrected. In the way of correcting these differences the following have arisen:

Eliminating the free play as much as possible and afterwards fastening the deflector rigidly into the hole by means of adhesive, soldering or mechanical means, which impede its movement, and preventing the deflector from coming out of the hole. In these cases when it is mounted, the deflector part is usually inserted in the hole of the nut from the outside inwards.

Retaining some free play, and so as to prevent the deflector from coming out of the hole, encasing the nut with a sleeve against which the external face of the deflector abuts, or encasing the nut with rigid or elastic rings. In these cases, as the deflector remains mobile within the hole, when the deflector is mounted it is usually inserted into the hole of the nut from inside the hollow of the nut towards the outside, until it abuts against the enveloping sleeve or ring. Mechanisms of ball lead screws of the type stated are described in Spanish Utility Model No. 160,274 of 4 Dec. 1970, in favour of ROTAX LIMITED, now expired.

In cases where some free play is retained, and the nut is encased with an enveloping sleeve or ring, the practice of making extensions in the upper part of the deflector body is a familiar one, which on being inserted into the hole of the nut, which may also have suitable notches, allow the exact depth of the depth of the S-shaped canal of the internal face of the deflector cap to be maintained, which eliminates part of the problem of inexact mounting of the depth of the canal of the deflector in relation to the half-spherical section of the helicoidal groove of the nut. In addition, descent of the deflector through the hole because of the free play is prevented, by which means free play with the balls is maintained. In this casing mounting is always from the outside inwards. The mechanism described as stated in Spanish Utility Model No. 157,693 of 18 Sept. 1970, in favour of ROTAX LIMITED, now expired.

For mounting from the inside of the nut outwards, there are known systems such as UNITED STATES PATENT OFFICE Pat. No. 2,519,177—22 Aug. 1950 of ALFRED PAUL MILL, based on British Pat. No. 707,918 of 5 Nov. 1946, which concerns a deflector mounted and screwed on the inside surface of the nut; British Pat. No. 897,008—26 Nov. 1957 of ALAN HERBERT EDWARD BRADFIELD, a deflector with an external peripherical ridge on its internal face, which comes into contact with the crests of the thread of the nut, which as it is mounted through the inside of the through hole of the nut with the ridge it impedes movement towards the outside; British Pat. No. 583,532 of 5 Mar. 1945 of JOHN GEORGE DOUGLAS, which adapts a deflector by means of the fixing of two cylindrical extensions to deflect the balls, in the opposite way, in the helicoidal canals of the nut which remain empty, not containing any balls when deflection takes place.

Also, in another embodiment for mounting from the inside of the nut outwards, a recess is provided along the inside in which the deflector is mounted, arranged between two helicoidal channels, which has a channel going in the opposite direction and a perfect continuity with the ones mentioned above as well as individual lugs which fit into as many notches again made in the recess of the nut, such that displacement of the deflector remains delimited in one direction, at the same time as its whole internal face is aligned on the surface to the body of the nut.

Also the joints established between the deflector and the nut are also sealed with silicon or a similar substance in order to obtain positional detachability between them. The mechanism described as stated in Spanish Utility Model No. 262,335 of 13 Oct. 1982, in favour of IPIRANGA, S.A.

The familiar forms described up to now attempt to obtain by one means or another the best possible centering between the S-shaped channel of the deflector, and the helicoidal channel of the nut.

Practice shows that this centering is problematic since there are errors of alignment between the machining of the trough hole of the nut, in which the deflector is fitted, and the two hollows which it must make in the two parallel lines of thread which it cuts across, which have to be perfectly symmetrical and equal on each line, but this inaccuracy usually originates in the fact that the formation of the hole and of the thread of the nut is done in two different machining operations. When the deflector cap is inserted in the hole another possibility of error arises, between the shape of the deflector, the hole of the nut, the thread of the nut and the position of the mouths of the S-shaped canal of the deflector. Also the depth of the S-shaped canal of the deflector can be affected as the body of the deflector is inserted more or less far, and is fixed or not, in the hole of the nut.

This exact positioning of the deflector in the hole of the nut is of fundamental importance for the good performance of a ball lead screw, since the balls as they roll trapped with pressure on two points, between the groove of the lead screw and the nut, are subjected to a load, which within the limits of capacity produces an elastic deformation of the ball. When a ball meets the mouth of the S-shaped canal of the deflector it is released from any load so it recovers its shape and travels through the canal freely, moved by the action of the inertia of its turning and the discharge action which arises as it finds itself free of the two compression forces and from the thrust of the balls following it. When it finishes passing with free play through the said canal of the deflector, the ball meets the other mouth of the said S, a narrowing formed by the section of the profiles of the helicoidal canals of the nut and the lead screw, having to travel from a zone without load to another with compression load.

Usually costly machining and adjusting operations are carried out to ease the problems of centering the entry and exit of the balls from the deflector, modifying, once the deflector is mounted on the nut, the displacement of the entries and exits in terms of accommodating them to the passage of the balls from the S-shaped canal of the deflector.

To resolve this problem of centering, another system, with variations, is familiar, which consists of making a deflector which comprises two projections which extend from opposite sides of the guide, beyond the edge of the opening into and along the groove in opposite directions, usually circumferential in relation to the said groove, towards the outside of the said opening, keeping the said balls to the guide towards the outside of the shaft so as to seat the said projections within the said groove of the nut, by which means the guide is kept in position, with its opposite ends located exactly at opposite ends of the track so as to deflect the balls in and out of the canal.

Each of the said projections is curved longitudinally, fitting into the curvature of the inside of the said nut, and each projection has a transverse section shape and size which fit into the shape and size of the transverse section of the groove of the nut.

By the description of the projections, these are practically cylindrical or half-cylindrical adhered to or leading against the body of the deflector. That is, put simply, two half-cylinders fitted in two parallel channels with a cylindrical profile. Mechanisms like the one stated are described in U.S. Pat. No. 3,815,435 applied for on 24 Nov. 1972, in favour of WARNER ELECTRIC BRAKE & CLUTCH CO., and in French Pat. No. 2,249,578 applied for on 30 Oct. 1973, in favour of LA TECHNIQUE INTEGRALE.

It is also the intention of the arrangement of the deflector described to achieve effective centering, but this cannot guarantee perfect construction of the deflector either, with exact alignment of the section of the mouths with the parallel lines of the half-cylindrical projections.

The deflector with half-cylindrical projections mounted on parallel lines has some possible movement, a consequence of the straight, horizontal linear free play parallel to the parallel lines which support the projections. This is a principle of geometry and mechanics, that two half-cylinders fitted in two parallel canals with a gothic or semicircular profile joined by a rigid bar, when there is a movement of the half-cylinders in the parallel canals, any point generates the trajectory of a straight line. Therefore, the possibilities of movement of this arrangement of deflector are very small.

The most suitable solution is one which allows the mouths of the deflector to adapt in a mobile way to the passage of the roll of the balls. What is required is a vertical and horizontal mobility of the section of the mouth at the entry and exit of the balls from the deflector, which because they are in an undulating spheroidal state move the deflector, accommodating it to the speed and the angle of load of the balls, caused by the amount of preload applied by the two tangential planes of transmission of load to the ball.

Therefore, an advance which improves upon the familiar techniques requires a greater adaptation of the deflector to the moving balls, whether they are entering or leaving the deflector, for which purpose a deflector with undulating spheroidal movement is required (a similarity of form between the supporting surface of the deflector and the balls themselves).

To achieve this we base our invention on the mechanical principle that two half-spheres fitted in two parallel canals with a gothic or circular profile joined by a rigid bar, when there is movement of the half-spheres in the parallel canals, any point will generate a figure represented by the surface of a spheroidal arch, for which reason the capacity for movements of adaptation is much greater in a mechanism with half-spheres than in one with half-cylinders, achieving the permanent adaptation required.

According to the present invention, a deflector is envisaged which has half-spherical supports which allow the deflector an undulating spheroidal movement, for applications in the recirculation of the balls of recirculating ball lead screws, which comprise two half-spheres adhered or joined to the body of the deflector forming a single piece. Each of these half-spheres is joined to each of the walls opposite each of the entry mouths of the S-shaped recirculating groove of the deflector.

The position of these half-spheres is such that they support their spherical surface on the semicircular profile of the canal of the thread of the nut, by which means the contact is one point, since the radius of the sphere is smaller than the generator radius of the profile of the canal of the nut. The flat face of the half-sphere is positioned in the same plane as the inside face of the deflector and parallel to the surface of the external periphery of the lead screw. The through hole, made radially in the nut so as to house the deflector with some free play, cuts across two parallel canals of the thread of the nut and when the body of the deflector is inserted, the deflector walls deflect the balls to form the closed circuit, as a result of which the portions of canal opposite the entry mouths of the recirculation of the deflector do not receive a flow of balls. The half-spheres are supported on the portions of parallel canals which do not receive flows of balls, which means that the half-spheres remain positioned in the parallel canals forming two parallel straight lines going in opposite directions, the straight lines which would join the centres of the mouths of the deflector and the centres of the half-spheres.

The height at which the half-spheres are joined to the body of the deflector, in relation to the base in which the S-shaped canal of the deflector is formed, is such that it allows the section of the canal of the thread of the nut and the mouths of the deflector to join, allowing the balls to enter and run along the canal lightly touching the crest of the surface of the lead screw between two canals of thread which join together to close the circuit. In the case of non-alignment, the deflector rocks, advances or recedes, that is, it moves in an undulating and spheroidal way until it accommodates its mouths to the profile of the canal of the thread of the nut.

The invention will now be described in more detail with the aid of one form of production, with reference to the drawings which show:

FIG. 1, a lead screw with balls recirculating by deflector with half-spherical supports, sectionalizing the nut and with transparent view of the axis of the lead screw showing circuits of balls recirculating in deflectors.

Figure 2:
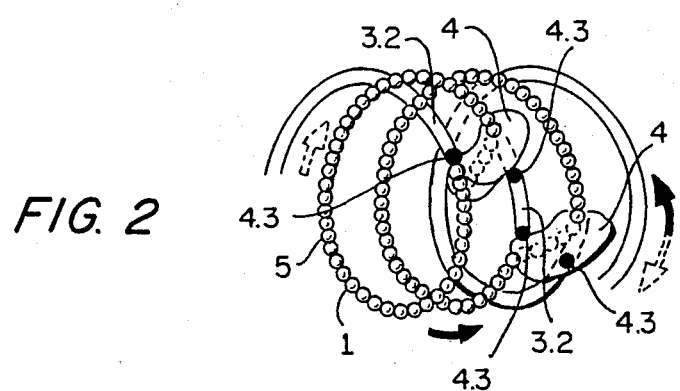

FIG. 2, some circuits of balls.

Figures 3, 4:
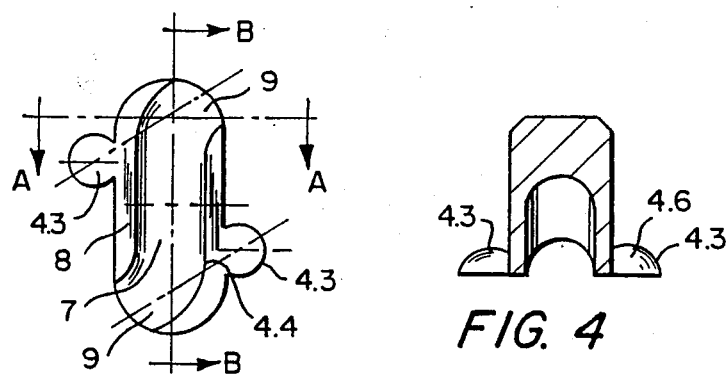

FIG. 3, view of the inside face of the deflector with half-spherical supports.

FIG. 4, A—A' cross-section of deflector with half-spherical supports.

FIG. 5, view of the internal face and body of the deflector with half-spherical supports.

FIG. 6, body of the deflector with half-spherical supports.

FIG. 7, B—B' cross-section of the deflector with half-spherical supports.

FIG. 8, housing of the deflector in a section of the nut, supported on half-spheres in two stretches of canal of semicircular cross-section, and graphs of the mobility of the central points of the deflector mouths.

FIG. 9, support of one half-sphere against one point of the canal of the nut.

FIG. 10, some positions of the mouth of the groove of the deflector in self-alignment with the profile of the channel of the thread of the nut, the ball having a compression load between the canals of the lead screw and the nut.

FIGS. 1 and 2 show a lead screw with balls recirculating by deflector with half-spherical supports which have an undulating movement for the self-alignment of the channel mouths, which comprises a multiplicity of ball bearings (1) arranged between two helicoidal channels (2.1, 3.1) of a semicircular profile, threaded, with regular pitch in the external periphery of a lead screw (2) and the internal periphery of a nut (3), there being fitted in the nut at least one deflector (4) for transferring the balls from one end of a circuit (5) or line of threaded channel of the nut to the other, forming a closed flow circuit of balls rolling when rotation relative to the lead screw and nut is imparted. To fit the deflector in the nut a through hole (6) is made radially which extends emptying two equal stretches of channel (3.1) in the parallel ends of a circuit (5) or thread, which are joined communicating by means of a groove (7) (FIGS. 3 and 5) made in the shape of an S in the inside face (8) (FIGS. 3 and 5) of the deflector (4), this groove (7) having two semicircular mouths (9) (FIGS. 3 to 7), of a similar shape to the channel (3.1) described above, for the entry and exit of the balls which run along the groove (7) lightly touching the crest (2.2) of the lead screw between the canals of the thread which have their circuit closed by the deflector. In FIGS. 3, 4, 5, 6 and 7 a deflector with the following characteristics is shown: the shape of the deflector (4) is such that its body (4.1) is fitted with perimetrical free play (4.2) in relation to the walls of the hole (6), and it presents two equal half-spheres (4.3) adhered or joined laterally to the deflector body forming a single piece. Each of these two half-spheres (4.3) being joined to each of the walls (4.4) opposite each of the entry mouths (9) of the S-shaped groove (7) of the deflector, their arrangement being such that if a straight line is drawn passing through each centre of the generator semicircumference of the mouth (9) of the S-shaped groove mentioned above and each half-sphere (4.3) centre, the two resulting straight lines would be parallel and would be the same distance apart as the pitch of the thread of the internal periphery of the nut and in opposite directions. The radius of the half-spheres (4.3) is equal to the radius of the ball bearings 1) and smaller than the generator radius of the semicircular profile channel (3.1) of the thread of the internal periphery of the nut. The position of joining of these half-spheres to the body of the deflector is such that the flat face (4.5) of the half-sphere is on the same plane as the internal face (8) of the deflector, and is parallel and with free play in relation to the external periphery of the lead screw (2). The face with a spherical surface (4.6) is supported with the free contact of a single point (10) against the semicircular profile of each stretch of canal (3.2) (FIG. 1) empty of balls in the thread of the nut (3), which when it is cut by the hole housing the deflector cannot receive the flow of ball bearings because these are deflected by the walls opposite the mouths of the S-shaped groove of the internal face of the deflector. The distance between the body of the deflector and the points of contact (10) of the half-spheres with the canal of the nut being greater than the free play between the periphery of the deflector body and the walls of the housing hole (6).

In FIGS. 8, 9 and 10 a deflector (4) is shown made up of a body (4.1) and two half-spheres (4.3) joined laterally, and inserted with free play into a hole (6) made radially in the nut (3), supporting the half-spheres (4.3) against the semicircular profile of the two parallel canals (3.2) attached and empty of balls, of the thread of the internal periphery of the nut, the contact of each half-sphere being a mobile point (10). When the balls pass along the groove (7) made in its internal face (8), an undulating-spheroidal movement occurs consisting of rocking and advancing and receding of the deflector in a way which achieves an exact self-alignment between the semicircumferences of the sections of the profile of the internal channels (3.1) of the nut, cut by the hole (6) and the mouths of the entries (9) of the S-shaped groove (7) made in the internal face (8) of the deflector (4), adjusting itself to the speed of movement of the balls and the angle of contact corresponding to the compression load to which the balls are subjected when rolling between the canal of the lead screw and the nut. Some of the positions of the undulation of the mouth in relation to the ball are shown in FIG. 10 with three different types of broken line.

With this invention of a deflector of half-spherical supports, advantages such as the following are achieved:

The depth of the internal canal of the groove of the deflector in relation to the profile of the thread of the nut is always regular. When the through hole of the nut carrying the deflector is made with free play, this give economy in the precision of the hole making. But the most important quality is that, by means of this free play and by means of the support on one point of each of the half-spheres on the profile of the thread of the nut, an undulating-spheroidal movement of the deflector is obtained, which allows the balls circulating to self-align the canals of the thread of the nut with the entry and exit of the recirculation canal of the deflector, thereby eliminating the problem of non centering between the through hole, the canal of the deflector and the thread of the nut. By this quality of adaptation by means of rocking and self-alignment of the thread canals, there is improvement in the continuity of the friction couple and the smoothness as well as qualities which allow the problems arising from inaccuracies which exist initially in all manufactured items to be adapted to or overcome, as well as future geometric variations, arising from variations in operating conditions, variations in speed, variations in preload, abrasion, heat conditions or any other such variations in operating conditions, etc., which thus allows a longlasting ball lead screw of greatly improved quality to be achieved.

The balls enter the channel under load from an exact level of rolling within the deflector groove, since this will rock in an undulating spheroidal movement until it finds the appropriate new position, an objective which cannot be achieved with fixed deflectors, or removable deflectors in recesses, or with those with lateral semicylindrical extensions.

Given the simplicity of construction of the attachment of the half-spheres to the deflector body, which is generally achieved by casting or soldering, this deflector is cheap to produce.

What is claimed is:

1. A ball lead screw comprising:
    (a) a lead screw (2) having an external periphery with a helicoidal channel (2.1) of a semicircular profile therein which is threaded with a regular pitch, said lead screw (2) further having a crest (2.2) on the external periphery thereof defined between adjacent lines of said helicoidal channel (2.1);
    (b) a nut (3) surrounding said lead screw (2) and having an internal periphery with a helicoidal channel (3.1) of a semicircular profile therein which is threaded with a regular pitch;
    (c) a multiplicity of ball bearings (1) arranged between the two helicoidal channels (2.1, 3.1);
    (d) a deflector (4) fitted in the nut (3) for transferring the ball bearings (1) from an end of one line of the threaded helicoidal channel (3.1) to an end of another line of the threaded helicoidal channel (3.1) so as to form a closed circuit (5) of flowing ball bearings (1) which roll when relative rotation is imparted between said lead screw (2) and said nut (3);
    (e) said nut (3) further including a through hole (6) extending radially therethrough for housing said deflector (4) in the nut (3), said through hole (6) extending between two equal and parallel lengths of said helicoidal channel (3.1) in said nut;
    (f) said deflector (4) including a body (4.1) fitted with perimetrical free play (4.2) in relation to walls of the nut (3) which define said through hole (6), said body including:
        (i) an inside face (8) with a substantially S-shaped groove (7) therein, said groove (7) having two semicircular mouths (9) of a similar shape to the helicoidal channel (3.1) of the nut (3) to permit entry and exit of said ball bearings (1) which run along said groove (7), said groove (7) lightly touching a crest (2.2) of the lead screw (2) which exists between lines of the threaded helicoidal channel (2.1) thereof that have their circuit (5) closed by the deflector (7);
        (ii) walls (4.4) opposite each of the mouths (9) of the S-shaped groove (7);
        (iii) two equal half-spheres (4.3) joined laterally to the body (4.1), each half-sphere (4.3) being joined to a respective wall (4.4) and having a radius equal to the radius of the ball bearings (1) and smaller than the radius of the semicircular helicoidal channel (3.1) of the nut (3), and each half-sphere (4.3) having a flat face (4.5) oriented in the same plane as the inside face (8), said flat face (4.5) being parallel to and associated with free play relative to the external periphery of the lead screw (2), each half-sphere (4.3) having a spherical surface (4.6) supported at a single free mobile contact point (10) against the semicircular profile of a line of the helicoidal channel (3.1) of said nut (3) which is empty of said ball bearings (1), the distance between the body of the deflector (4) and the points of contact (10) of the half-spheres (4.3) being greater than the amount of perimetrical free play (4.2) in relation to walls of the nut (3) which define said through hole (6).

2. A ball lead screw to claim 1, wherein the half-spheres (4.3) of the deflector (4) are supported against the semicircular profile of two parallel lines of the helicoidal channel (3.1) which are empty of said ball bearings (1), a contact being established for each half-sphere (4.3) in the form of one said mobile point (10) which determines an undulating-spheroidal movement of rocking, and advancing and receding, of the deflector (4) such that an exact self-alignment is provided between the semicircular profiles of the internal channel (3.1) of the nut cut by the hole (6) and the mouths (9) of the S-shaped groove (7) cut in the internal face (8) of the deflector (4).

3. A ball lead screw according to any one of claim 1 or 2, further including seal means for preventing infiltration of dirt and loss of lubricant between said lead screw (2) and nut (3).

4. A ball lead screw according to any one of claim 1 or 2, wherein said half-spheres (4.3) permit self-alignment by actual movement of the ball bearings (1) between the channel (3.1) of the nut (3) and the deflector (4), as a result of which the capacity for movement of adaptation is precisely the correct amount required at any time.

* * * * *